United States Patent [19]
Johnson

[11] Patent Number: 5,814,971
[45] Date of Patent: Sep. 29, 1998

[54] EMERGENCY FLORESCENT INVERTER FOR MAGNETIC AND ELECTRONIC BALLASTS

[75] Inventor: James C. Johnson, Conyers, Ga.

[73] Assignee: National Service Industries, Inc., Atlanta, Ga.

[21] Appl. No.: 998,582

[22] Filed: Dec. 29, 1997

[51] Int. Cl.[6] .............................. H02J 9/06; H05B 41/29
[52] U.S. Cl. .................................. 320/127; 320/DIG. 36; 315/86
[58] Field of Search ..................................... 320/118, 123, 320/127, 112, DIG. 35, DIG. 36; 315/86, 209 R, DIG. 7; 307/66, 48, 44, 37; 363/98, 132

[56] References Cited

U.S. PATENT DOCUMENTS

| | | | |
|---|---|---|---|
| 4,682,078 | 7/1987 | Pascalide | 315/86 |
| 4,727,291 | 2/1988 | Bavaro | 315/86 |
| 4,977,351 | 12/1990 | Bavaro et al. | 307/66 X |
| 5,202,608 | 4/1993 | Johnson | 315/86 |
| 5,471,114 | 11/1995 | Edwards et al. | 315/86 |

*Primary Examiner*—Edward Tso
*Attorney, Agent, or Firm*—Kenneth E. Darnell

[57] ABSTRACT

An improved inverter or "fluorescent battery pack" useful particularly in an emergency lighting system with both magnetic and electronic ballasts of both "rapid start" and "instant start" configurations, the present inverter is rapidly installable in emergency lighting systems which include fluorescent lighting fixtures operable with either magnetic ballasts which are typically "non-isolated" or electronic ballasts which are typically "isolated". The inverter circuitry of the invention is simply installable in the present emergency lighting system due to an effective disconnection of the ballasts with concurrent connection between the inverter and lamping, only two effective connections to the lamp thus being necessary with a resulting avoidance of wiring redundancy.

16 Claims, 8 Drawing Sheets

EMERGENCY FLORESCENT INVERTER FOR MAGNETIC AND ELECTRONIC BALLASTS

DESCRIPTION OF THE PRIOR ART

1. Field of the Invention

The invention relates generally to inverter circuitry useful in "fluorescent battery pack" systems which operate with standard fluorescent lighting fixtures to produce an emergency lighting capability and particularly to an improved inverter circuitry which can be rapidly installed "on-site" in association with lighting fixtures which utilize either magnetic ballasts or most available forms of electronic ballasts.

2. Background of the Invention

Emergency lighting functions have previously been incorporated into existing fluorescent lighting systems, the installation and wiring of such lighting systems to incorporate emergency functions being known as being both troublesome and time-consuming. The disclosure of U.S. Pat. No. 5,202,608 addresses these problems prior to the improvements in the field brought about by products based upon this patent. The inverter circuitry particularly disclosed in U.S. Pat. No. 5,202,608 was subject to limitations in view of the utility of said circuitry only with magnetic ballasts essentially of an industry standard configuration as was prevalent at the time of this patent. The inverter circuitry of this patent allowed connections to the ballast to be eliminated with concomitant simplification of the installation of "fluorescent battery packs" or "inverters" which provide an emergency function to standard fluorescent lighting systems. Other United States patents of the prior art which dealt with similar situations include U.S. Pat. Nos. 4,751,398 to Ertz, III and 4,682,078 to Pascalide. The patents to Pascalide and Ertz, III disclose inverter circuitry per se but do not overcome a primary problem of the prior art as is described by Herzog in U.S. Pat. No. 3,836,815. Herzon provides a realization that the starting capacity utilized in most fluorescent ballasts is troublesome to inverter circuitry, a situation which causes most prior art inverters to use active switching devices to separate the ballasts from the lamp and to connect an inverter for emergency operation. Sieron et al, in U.S. Pat. No. 4,144,462, provide similar disclosure relating to the operation of inverter circuitry in an emergency lighting system.

The prior art does not provide for inverter circuitry useful in an emergency lighting system of the type described in U.S. Pat. No. 5,202,608 and which is useful with both conventional magnetic ballasts which are typically not "isolated" and electronic ballasts of both "rapid start" and "instant start" configurations which are typically "isolated". In fact, the industry has in recent years considered that the proliferation of differing electronic ballast designs has brought about a complete loss of standardization of circuitry which would cause failure of any retrofit process or procedure which relied upon a commonality of ballast structure. However, the present invention provides inverter circuitry capable of an essential simplification of connections to a ballast which not only allow the rapid installation with lighting fixtures to produce emergency capability such as is described in 5,202,608 but which also is capable of usage with both magnetic and electronic ballasts. The invention in part recognizes a similarity of the output stages of most available electronic ballasts and produces inverter circuitry which permits connection to the output stages of such electronic ballasts while retaining the capability of simplified connection to magnetic ballasts.

SUMMARY OF THE INVENTION

The disclosure of U.S. Pat. No. 5,202,608, by the present inventor and assigned to the present assignee, is incorporated hereinto by reference.

The discussion in the portion of 5,202,608 which corresponds hereto essentially applies to the improved inverter circuitry and emergency lighting system of the present invention as to ease of installation and as to the nature of an emergency lighting system into which the present inverter circuitry is incorporated. However, the present inverter circuitry finds utility with either new or existing fluorescent lighting fixtures and will accommodate available ballasts whether magnetic or of prevailing electronic designs of both rapid-start and instant-start configurations. In particular, the present inverter circuitry accommodates both "non-isolated" and "isolated" types of ballasts, the non-isolated ballasts typically being of conventional magnetic configuration while isolated ballasts are typically of electronic design as will be discussed in greater detail hereinafter.

Accordingly, it is a primary object of the invention to provide an emergency lighting system utilizing improved inverter circuitry which is rapidly installable with existing fluorescent fixture systems to provide an emergency function, the inverter circuitry being useful with both magnetic ballasts and most available electronic ballasts whether of rapid-start or instant-start configurations.

It is another object of the invention to provide improved inverter circuitry having a lamp/ballast interface with reduced lamp side connections and useful with fluorescent lighting fixtures operable with either magnetic ballasts or commonly available electronic ballasts, whereby existing fluorescent lighting can be easily and simply provided with an emergency lighting function.

It is a further object of the invention to provide improved inverter circuitry which is rapidly and easily incorporated into fluorescent lighting fixtures to form an emergency lighting system, the improved inverter circuitry being usable with either non-isolated ballasts which typically include conventional magentic ballasts or with isolated ballasts which typically include available forms of electronic ballasts.

Further objects and advantages of the invention will become more readily apparent in light of the following detailed description of the preferred embodiments.

DESCRIPTION OF THE PREFERRED EMBODIMENTS

The disclosure of U.S. Pat. No. 5,202,608, entitled "Emergency Lighting System utilizing Improved and Rapidly Installable Fluorescent Inverter", James C. Johnson, inventor, and assigned to the present assignee, is incorporated hereinto by reference.

Figure 1:
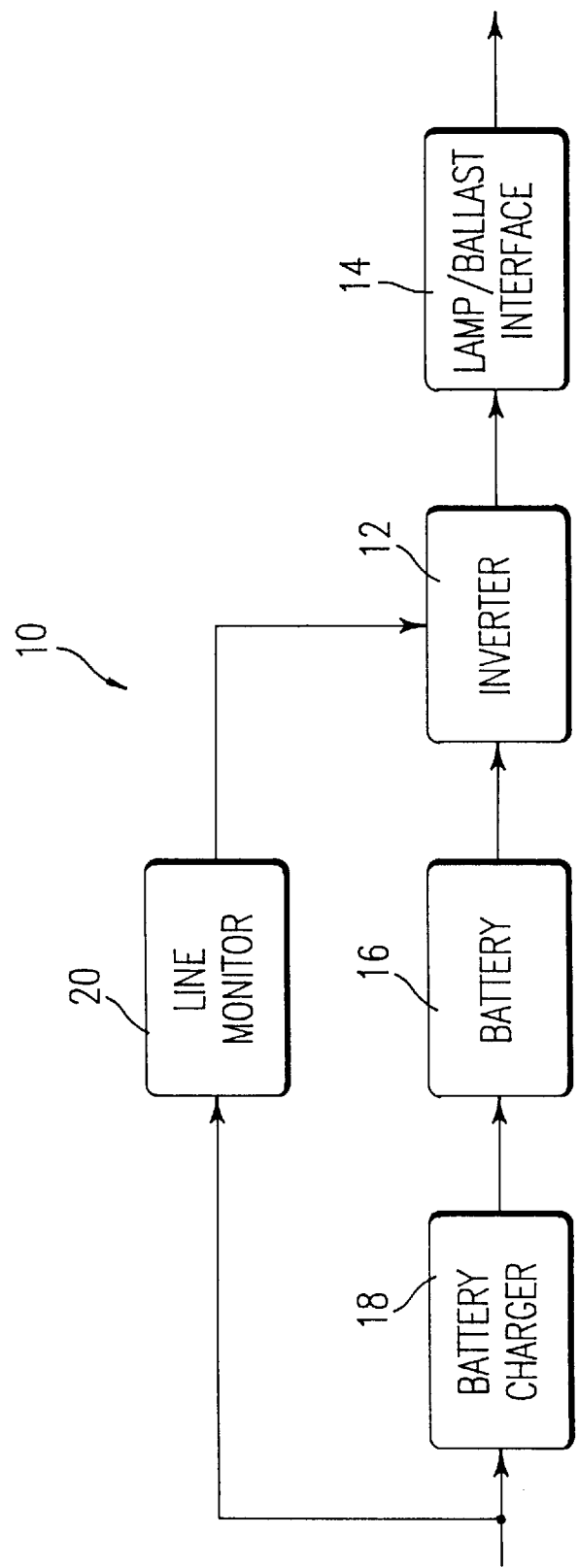
FIG. 1 is a schematic illustrating the usual location of an improved inverter circuit according to the invention within a lighting system to provide emergency capability to said system.

Referring now to the drawings and particularly to FIG. 1, the basic functions of an inverter system such as is embodied in a fluorescent battery pack or the like shown generally at 10 are illustrated preliminarily to description of the preferred embodiment of the invention. The fluorescent battery pack 10 typically comprises an inverter 12 which directly connects to lamp/ballast interface 14. A lamp and ballast form a part of a fluorescent lighting fixture (not shown) and need not be shown in FIG. 1 for the illustration intended relative to this figure. The system shown in FIG. 1 further comprises a battery 16, a battery charger 18 and a line monitor 20. In a conventional system, the inverter 12 both starts and operates a discharge lamp (not shown) from the battery 16 upon failure of line voltage. The line monitor 20 acts to monitor line voltage with the inverter 12 starting and operating the discharge lamp (not shown) when the line monitor 20 senses failure of line voltage. As is conventional in the art, the battery charger 18 acts to maintain charge of the battery 16.

Figure 2:
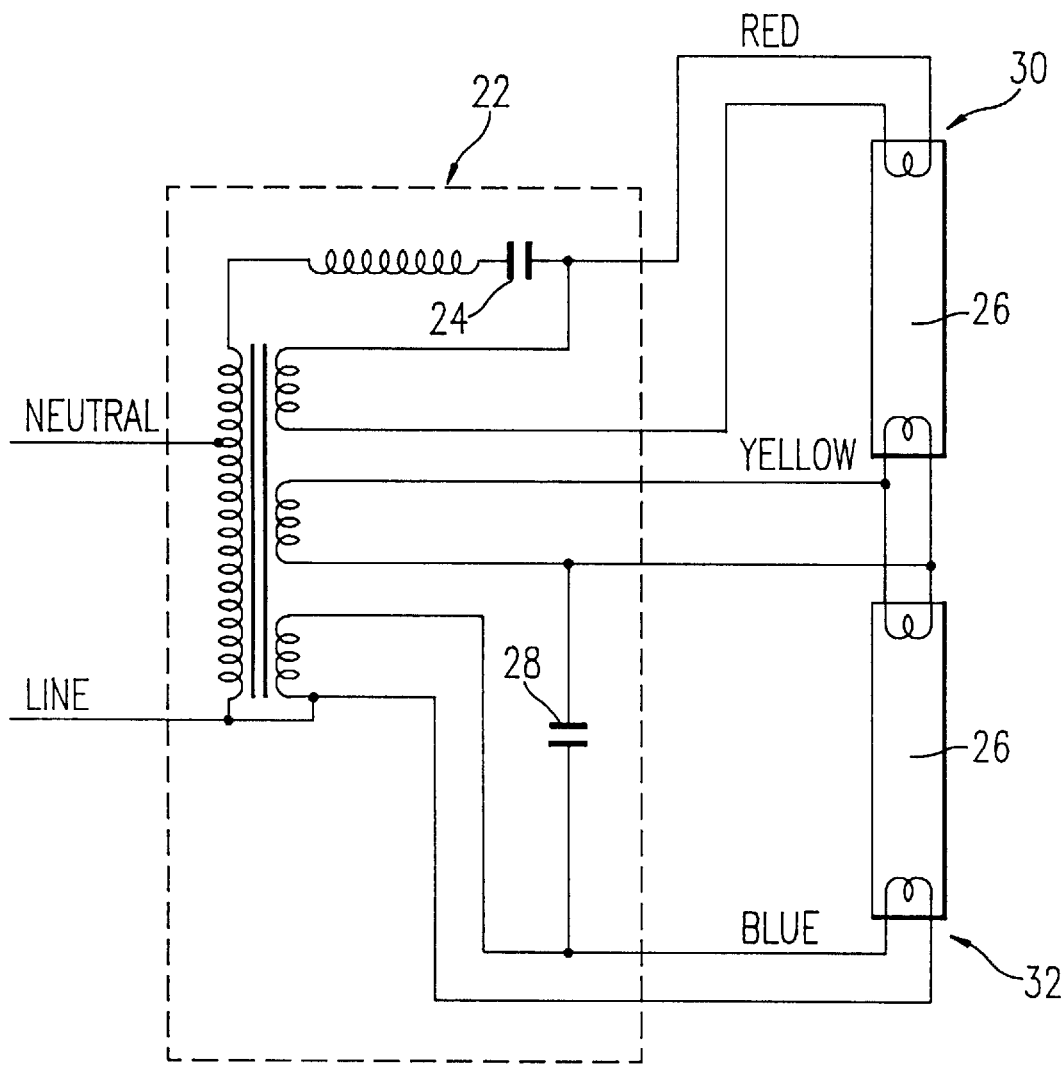
FIG. 2 is a schematic of a conventional magnetic ballast such as is typically utilized with a fluorescent lighting fixture.

As will be described in detail hereinafter, the inverter 12 takes that configuration specified according to the present invention and is operable with the lamp/ballast interface 14 to provide the advantages of the invention which have been enumerated herein. In order to better appreciate the utility of the present invention, reference is particularly made to FIGS. 2 and 3 which respectively illustrate the electrical structure of a conventional magnetic ballast and the output stage of commonly available electronic ballasts. Magnetic ballast 22 of FIG. 2 is exemplary of a "non-isolated" ballast, that is, the ballast 22 has electrical connection either directly or indirectly between the output, that is, lamp connections, and primary or line connections. The magnetic ballast 22 includes a starting capacitor 28 which is connected directly across one of a pair of fluorescent lamps 26. Early conventional inverters such as inverter 12 of FIG. 1 had outputs which were AC and usually of the order of 20 to 25 kilohertz. Such an output, when applied directly across one of the lamps 26 such as the lower lamp 26 of FIG. 2, causes the capacitor 28 to appear as a substantial load to the inverter 12 and battery 16 of the system of FIG. 1. In the prior art prior to U.S. Pat. No. 5,202,608, conventional inverters such as the inverter 12 of FIG. 1 required active switching devices (not shown) for separation of the ballast 22 from the lamps 26 and for connection of the inverter 12 for emergency operation.

Prior art lamp/ballast separation involved cutting leads to at least one end of the lamp and totally separating the ballast from the lamp at that point. The necessity for such a separation was believed due to the following concerns:

(1) the ballast might "load" or create an unwanted current path for the inverter;

(2) the inverter might present an unwanted current path for normal ballast operation;

(3) the high voltage created by the inverter for striking the lamp might damage ballast components; and, (4) the high voltage created by the inverter for striking the lamp might create an unsafe voltage-to-ground in the event the ballast was a non-isolated ballast. These concerns are addressed herein in detail.

Circuitry disclosed in U.S. Pat. No. 5,202,608 utilize the non-isolated character of the ballast 22 and therefore the connection between the output and the primary to effect connection of an emergency inverter to lamping with avoidance of wiring redundancy. The invention was facilitated at least in part through a recognition that the connection referred to, although possibly of an inductive nature, is of low impedance to DC inverter output.

In a manner similar to that described in U.S. Pat. No. 5,202,608, the present circuitry, which will be described in greater detail relative to FIG. 4, comprises an output circuit which utilizes a voltage doubling rectifier circuit. Accordingly, the output is not AC but is DC or pulsating DC. This inverter output according to the present invention and also as is described in the aforesaid patent causes the capacitors 24 and 28 of FIG. 2 to become blocking devices, that is, the capacitors 24, 28 will charge to some voltage level and cease to conduct upon reaching this level and will no longer represent substantial loads to the inverter function. It can thus be seen that isolation of the ballast 22 from the inverter function is unnecessary such as would be represented by the inverter 12 of FIG. 1 and lamp function such as would be represented by the lamps 26 when the inverter is operating since the ballast 22 represents very little loading when utilizing this type of inverter output. However, when line voltage is applied to the ballast 22, current must be prevented from flowing through the inverter since damage can occur to the inverter and alteration of normal ballast operation can also occur. As will be described hereinafter and as is described in 5,202,608, isolation can be accomplished on the primary side of the ballast 22 without the need for cutting and stripping leads on the "lamp side" of a previously wired fixture (not shown). As is seen in FIG. 2, one of the lamp leads 32 is connected directly to one end of one of the fluorescent lamps 26. A portion of a winding can be provided in series with this path. However, such a winding represents a small impedance to DC current. Accordingly, one lead of the inverter output can be connected on the primary side of the ballast 22 with little effect upon inverter operation. The remaining inverter lead can be connected to the other end of the fluorescent lamp utilizing an insulation displacement connector (not shown) which does not require cutting and stripping. The connections thus allowed according to these teachings are shown in FIG. 5 and will be described in detail hereinafter.

While the inverter output voltage of the present emergency inverter is necessarily a high voltage in order to strike fluorescent lamping without the benefit of filament heating, for reasons of safety, this high voltage must be isolated from ground in order to eliminate high voltages referenced to earth ground. In the present invention, this isolation from ground is accomplished by relay contacts located in both primary leads of the ballast. When these relay contacts are "open", the ballast is effectively "floated" and potentially harmful voltage to ground is eliminated.

While the present inverter circuitry functions with magnetic ballasts, and particularly the non-isolated ballasts of FIG. 2, in essentially the same manner as does the inverter circuitry described in 5,202,608, the primary object of the present invention is to accommodate both magnetic and electronic ballasts to the degree possible. In both situations, isolation from ground is necessary and is best accomplished by location of relay contacts in both primary leads of the ballast. It is further to be recognized that at least one set of contacts is necessary in order to interrupt ballast power for test purposes.

Figure 3:
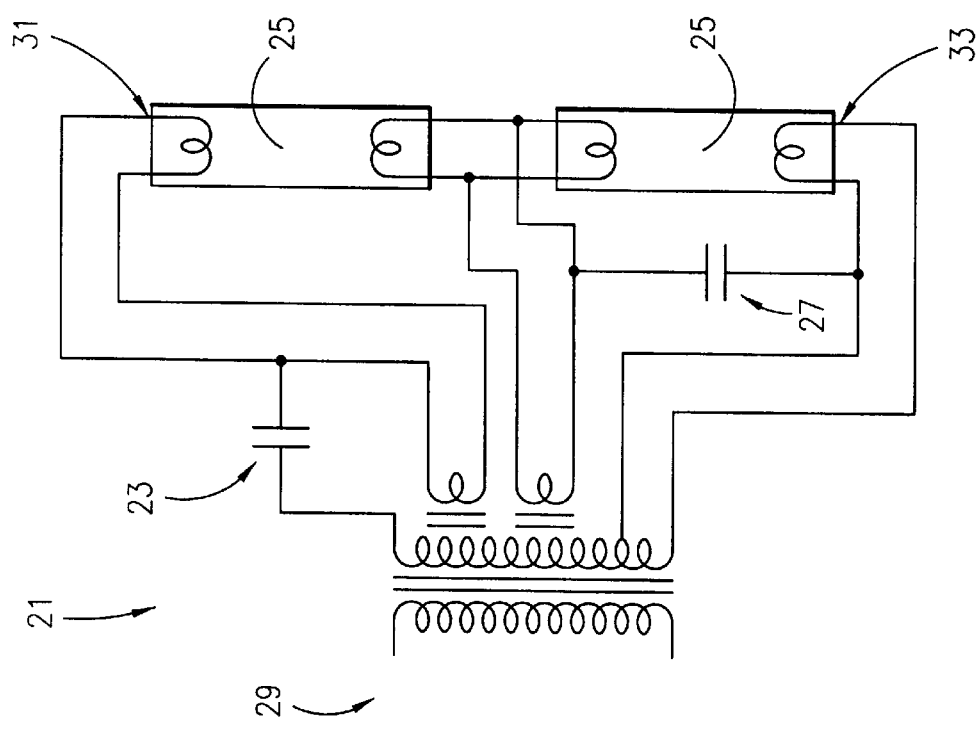
FIG. 3 is a schematic of an output stage of an "isolated" ballast such as is common in most available forms of electronic ballasts.

Referring now to FIG. 3, a typical output stage 21 characteristic of most currently available electronic ballasts is shown. It is to be emphasized that FIG. 3 only illustrates the output stage 21 of an electronic ballast, the remaining portions of the ballast not being shown. The output stage 21 is characteristic of electronic ballasts which are known as "isolated" ballasts. Such ballast is indicated as being isolated by virtue of the fact that no electrical connection exists between lamping and internal circuitry of the ballast. In essence, no conductive path thus exists and the output stage 21 is magnetically isolated. The present invention has as a primary underlying feature thereof the recognition that electronic ballasts having an output portion of the type represented by the output stage 21 of FIG. 3 is the only matter of importance to the connection of an emergency inverter to the ballast. Simplifications of installation which are provided by the present invention also thus apply to electronic ballasts having an output portion of the type represented by the output stage 21 as shown. It is further to be seen that the circuit shown in FIG. 3 represents a specific two-lamp ballast. Similar circuits and similar combinations are clearly possible for facilitating the operation of different types of lamps and different numbers of lamps of the same type.

Substantial differences between magnetic ballasts and electronic ballasts are recognized in the art and those differences form the basis for the present belief that the similar inverter circuitry could not be employed with both kinds of ballasts. As an example, transformers utilized by typical electronic ballasts are high frequency devices and are therefore much smaller than transformers comprising typical magnetic ballasts. However, as alluded to hereinabove, similarities exist between output circuits of the two kinds of ballasts. Referring again to FIGS. 2 and 3, both circuits contain a capacitor, the capacitor 24 of FIG. 2 and the capacitor 23 of FIG. 3, which is effectively in series between the transformer and lamping. Such circuitry may or may not contain respective capacitors 28 (of FIG. 2) and 27 (of FIG. 3) which are beneficial in multiple lamp configurations in particular as an aid in starting additional lamping. Since the capacitors 28 of FIG. 2 and 27 of FIG. 3 are of a higher voltage rating than previously used on magnetic ballast, the concern that the inverter voltage might damage the capacitors inter alia is further diminished. The circuitry of FIG. 3 further includes lamps 25 and lamp leads 31 and 33. The circuitry of FIG. 3 is further drawn to include output transformer 29 of the electronic ballast (not shown) which functions in association with the output stage 21 in a known manner.

The present inverter circuitry must be designed to account for a major difference between the circuitry of FIGS. 2 and 3. To wit, the circuitry of the output stage 21 of FIG. 3, which represents the typical electronic ballast, is magnetically isolated from the remainder of the circuitry of the electronic ballast (not shown) and contains no direct or indirect electrical connection to the primary. Accordingly, it is not possible to rely upon circuitry internal of the electronic ballast as a means of coupling or connection of the inverter output energy to the lamps 25. However, the present invention allows utilization of similar circuitry as is described in 5,202,608 for use with magnetic ballasts as circuitry capable of accommodating both magnetic ballasts and electronic ballasts by providing for the concerns previously enumerated. Simple and elegant circuitry refinement relative to said patent is used to tremendously extend the utility of the inverter circuitry of said patent.

Figure 8:
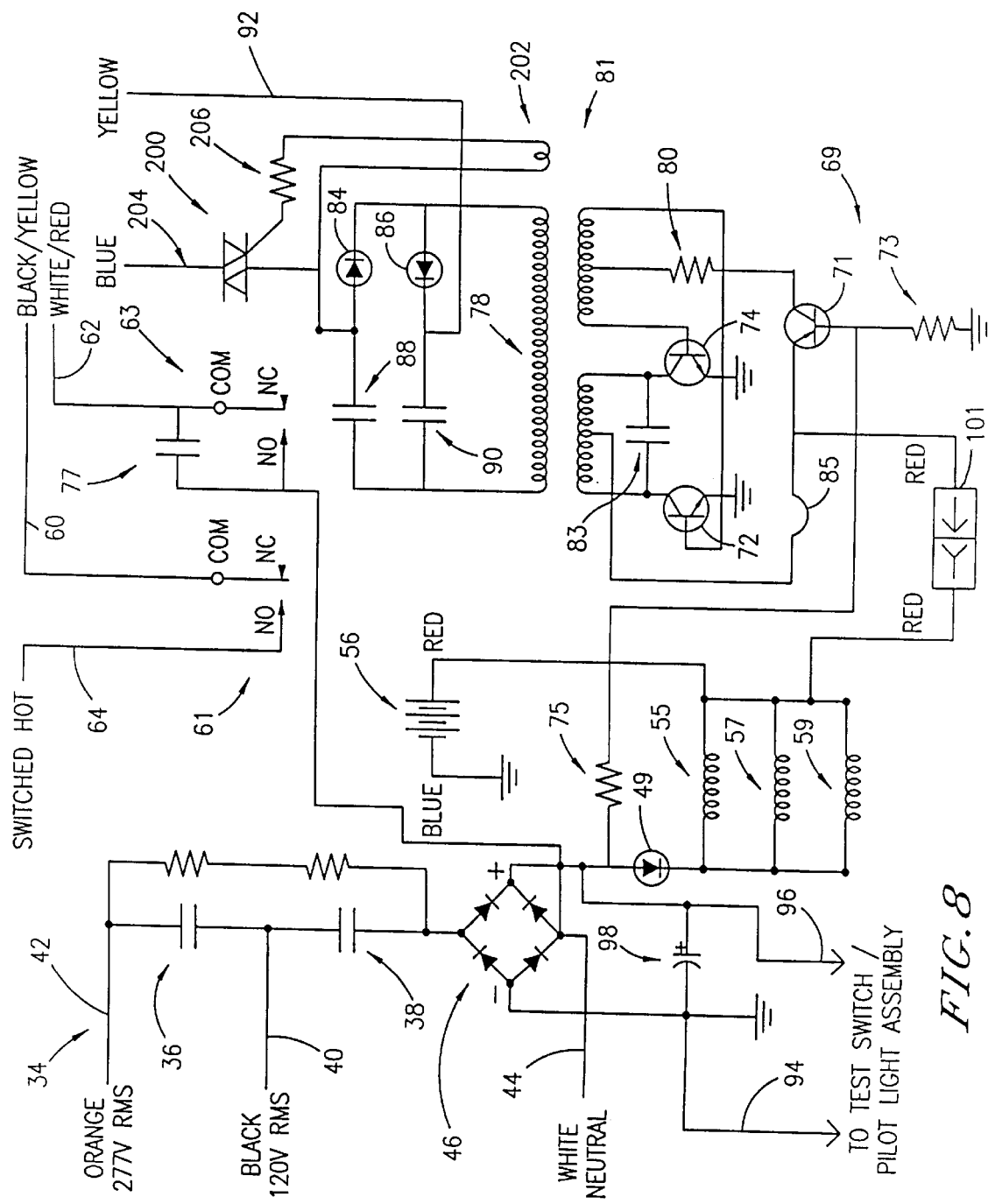

Referring once again to FIGS. 2 and 3, the respective capacitors 24 and 23 are seen to be series capacitors in both circuits and to present a high impedance to the DC output of inverter circuitry, these capacitors not being seen as a significant load to the inverter circuitry. In a similar manner, the capacitors 28 and 27 respectively of FIGS. 2 and 3 act as blocking devices to DC and are not seen as significant loads. Accordingly, both types of ballasts, that is, magnetic and electronic ballasts having output portions such as the output stage 21 of FIG. 3, can be connected directly to the inverter circuitry of the invention as will be described herein relative to FIG. 4 inter alia and will not require that the ballast be totally disconnected from the inverter circuitry in order to operate properly in the emergency mode. In the "normal" mode, when line power is applied to the ballast, it will become necessary to provide a circuitry function which prevents the inverter output circuit from becoming an unwanted load to the AC ballast. In a preferred embodiment of the invention as described relative to FIG. 4 hereinafter, this function is provided by use of a single additional relay contact. Other embodiments of the invention can provide such function by means of a triac or similar semiconductor device having sufficient AC blocking capability in the "off" condition as seen in FIG. 8.

Figure 4:
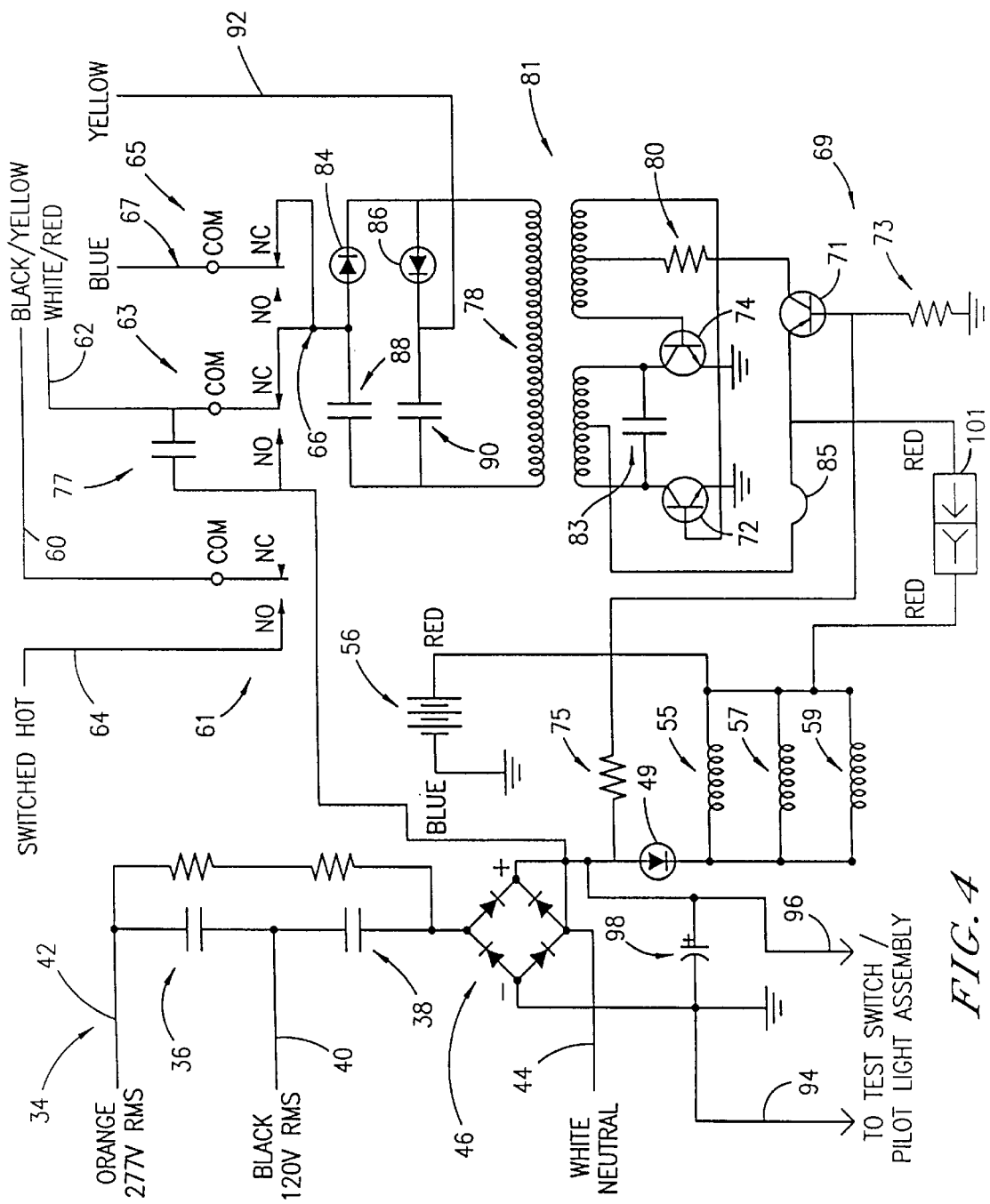
FIG. 4 is a schematic illustrating improved inverter circuitry usable with both magnetic ballasts and electronic ballasts having a commonly used output stage.
Figure 5:
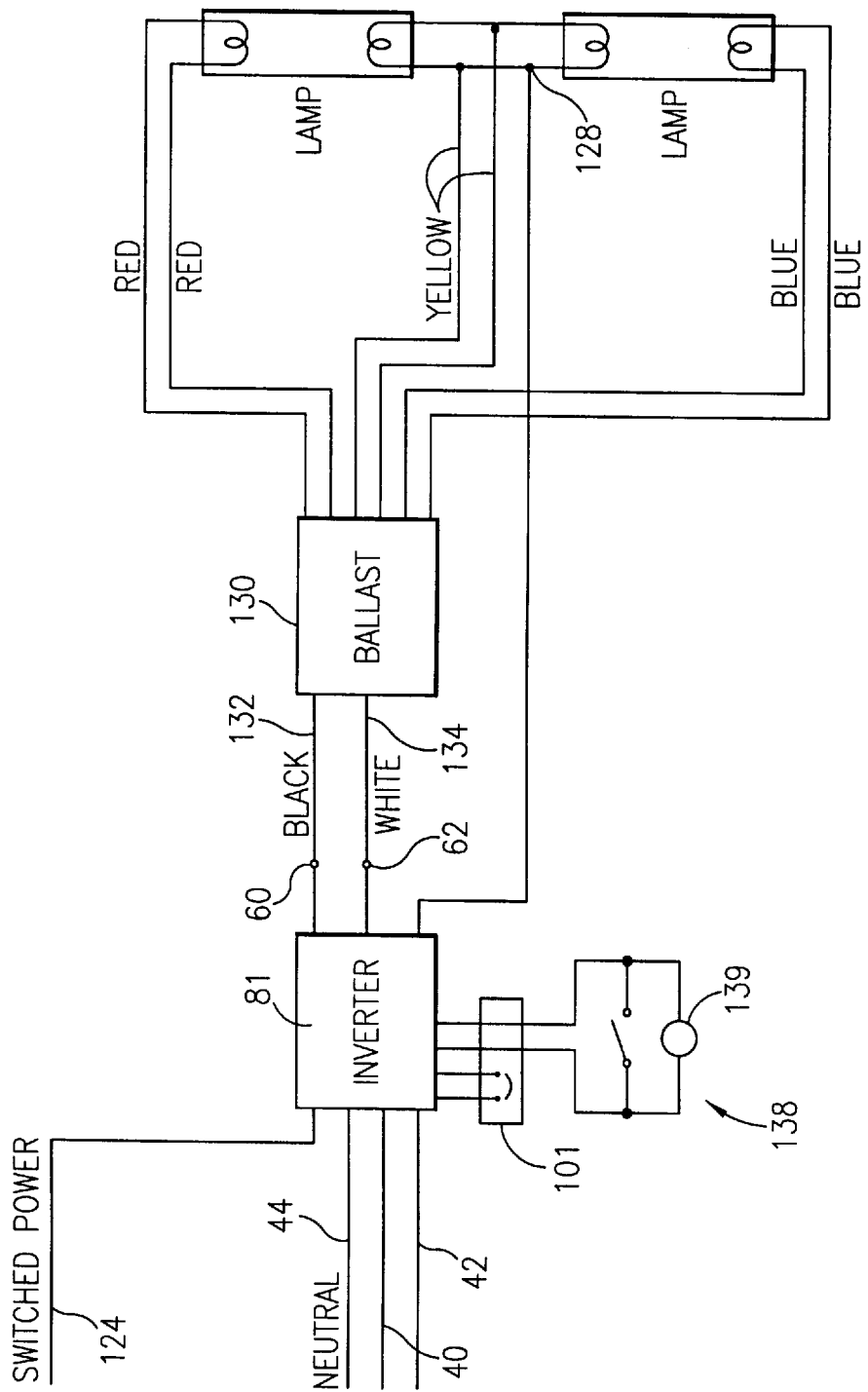
FIG. 5 is a diagram illustrating simplified electrical connections according to the invention of the inverter circuitry to a magnetic ballast.

Referring now to FIG. 4, the objects of the invention are seen to be met by an inverter circuitry having only a two wire connection to lamping. Such connections can be made by "insulation displacement" connectors as are common in the art since it is not necessary to sever or disconnect any ballast-to-lamp wiring.

Considering the particulars of FIG. 4, a preferred embodiment of the invention is illustrated as a portion of an emergency lighting system shown generally at 24. A battery charging function is seen to be embodied in that structure which includes capacitors 36, 38 which are AC rated capacitors forming a series impedance to an unswitched AC source (not shown). This unswitched AC source may be either 120 volts applied at the juncture of the two capacitors as seen at 40 or 277 volts applied at point 42, both voltages being with respect to neutral as seen at point 44. The capacitors 36, 38 in combination with diode bridge 46 and relay coils 55, 57 and 59 form the charging circuit for battery 56. Since the relay coils 55, 57 and 59 form a portion of this path, this part of the charging function also provides a line monitor function, that is, as long as power is applied at either 40 or 42, current will flow through the relay coils 55, 57 and 59 and will change the position of relays 61, 63 and 65 from the position shown, i.e., from normally closed to normally open. However, if power is removed from either 40 or 42, current will be interrupted from the relay coils 55, 57 and 59 and contacts of the relays 61, 63, 65 will change state and revert to the normally closed positions as shown in FIG. 4.

In the energized positions of the contacts of the relays 61, 63 and 65, i.e., the normally open positions, the relays 61 and 63 apply power to a ballast (not shown) such as would be connected at points 60 and 62. The ballast may be either magnetic or electronic as defined herein. Power applied at point 64 may be either 120 volts or 277 volts depending upon the ballast which is used. The power applied at point 64 may also be switched since circuit operation or battery charging function are not affected.

Upon the loss of power to point 40 or point 42, the three relay coils 55, 57 and 59 cause a change of state, thereby isolating the primary of the ballast (not shown) from its previous connection to point 64 and point 44 and will connect one lead of the ballast primary (not shown) to the inverter output shown at 66.

Inverter circuitry shown at 81 comprises transistors 72 and 74 and a transformer 78, a resistor 80 and a capacitor 83, these components forming a self-driven resonant inverter which operates in the 20 to 25 kilohertz range. The output of this inverter circuit 81 is modified by a voltage doubler circuit consisting of diodes 84 and 86 and capacitors 88 and 90. Accordingly, the output appearing at the inverter output 66 or at lead 92 is a high voltage DC or pulsating DC depending upon load. The lead 92 is connected to a lamp (not shown), lead 67 also connecting to the lamp (not shown) from the inverter 81. When used with a magnetic ballast as described herein, the lead 92 is the only connection to the lamp leads (not shown). When utilizing electronic ballasts as described herein, the lead 92 and the lead 67 connect to the lamp lead (not shown). In either situation, the leads 92 and 67 are preferably connected through use of insulation displacement connectors (not shown) which allow connection to be made to the lamp leads without cutting or striping existing fixture wiring. Even though the lead 67 does not need to be connected when using magnetic ballasts, the lead 67 can be connected so as not to leave a lead "unconnected" even though connection of the lead 67 will have no function when used with a magnetic ballast.

Although not shown in FIG. 4, points are available for connection of auxiliary functions such as a test switch and pilot light assembly as shown and described hereinafter and which use a minimum number of wires for connection to said points. The test switch and pilot light arrangement useful with the invention comprise a normally open switch in a parallel combination with a light emitting diode pilot light (not shown). Such an open switch causes the voltage occurring across the diode bridge 46 to cause illumination of the light emitting diode pilot light. When such a switch is closed, current is by-passed away from the relay coils 55, 57 and 59 and the battery 56 to simulate a power outage. The two wire test switch/pilot light arrangement can be attached to the circuit through an external connector 101 which incorporates a jumper so that the inverter 81 can be disabled during shipping and installation. A filter capacitor is provided at 98 for smoothing of charging current and for elimination of relay noise. Diode 49 prevents the battery 56 from backfeeding during testing.

In U.S. Pat. No. 5,202,608, the relay RY3 functions to turn on the inverter which is shown as the inverter 70 in that patent. In the present circuitry, this function is carried out by a transistor switch 69 which is comprised of a transistor 71, a resistor 73 and a resistor 75. As such, the present circuitry functions with only three relays, that is, the relays 61, 63 and 65, and does not require additional relays as compared to the corresponding circuitry of the aforesaid patent. The relay 61 of the present circuitry functions essentially in the manner of the relay RY1 of the prior patent in that the relay 61 turns the ballast off in order to test said ballast. In the aforesaid patent, relay RY2 is in the neutral lead of the ballast and has two functions, that is, a first function of totally opening up both primary leads of the ballast and a second function of connecting output leads of the inverter to the ballast. The relay 65 connects the output leads of the inverter to the ballast and is open when power is applied to the ballast. The relay 65 further has the lead 67 connected thereto through the "common" of the relay 65.

Capacitor 77 provides a transient reference to ground by blocking current if current attempts to go back to neutral.

The capacitor 83 essentially corresponds to the capacitor 82 of 5,202,608 except that the capacitor 83 is placed across the primary winding of the transformer 78 rather than across the secondary winding as is seen in the aforesaid patent.

The battery 56 employed in the circuitry of FIG. 4 can take the form of a conventional NICAD battery having a voltage of 3.6 volts and a rating of 4 amp hours.

The connector 101 provides several functions including the ability to disconnect the battery 56 during shipping. Further, the connector 101 can be utilized to provide a location external of the circuitry of FIG. 4 to connect a test switch and pilot light as is referred to hereinafter. The connector 101 assures that all connections are available, external to the inverter housing, for monitoring battery condition and for activating an automated test cycle as desired. Provision is thus made to add on testing and pilot light features without alteration of standard circuitry as seen in FIG. 4. A ground reference is also thus provided for allowing measurement of battery voltage externally of a housing (not shown) which contains the circuitry of FIG. 4, thereby enabling the placement of the circuitry into a test mode from externally of a housing containing the circuitry.

Referring now to FIG. 5, use of the inverter 81 with a magnetic ballast 130 is seen in a manner which is essentially identical to that shown in U.S. Pat. No. 5,202,608 which illustrates that certain "lamp side" connections described in the prior patent are eliminated through use of the inverter circuit 81. It is to be seen that only a single lamp side connection 128 is required. The inverter 81 is connected to the magnetic ballast 130 through the points 60, 62 specified previously relative to FIG. 4. The ballast line leads 132 and 134 are thus connected directly to the inverter 81. These lead lines 132 and 134 are easily available in all lighting fixtures since they must be connected directly or indirectly to the power buss. In most cases, the lead lines 132 and 134 are stripped and may simply be inserted into connectors (not shown) leading from the points 60 and 62. The connector 101 can connect to the inverter 81 to incorporate a battery disconnect function and to provide connection to a combination test switch and pilot light arrangement as described above and as is shown at 138. The test switch and pilot light arrangement 138 in a preferred embodiment uses only two wires and connects to the inverter 81 such as through the points 94 and 96 of FIG. 4. The test switch portion of the arrangement 138 preferably comprises a normally open switch in a parallel combination with a light emitting diode pilot light portion of the arrangement 138. When the switch portion of the arrangement 138 is open, the voltage appearing across the diode bridge 46 of FIG. 4 causes light emitting diode 139 to be illuminated. Closure of the switch causes current to be by-passed away from the relay coils 55, 57 and 59 and the battery 56 of FIG. 4 to simulate a power outage. The connector 101 which attaches the arrangement 138 to the inverter 81 incorporates a jumper seen at 85 in FIG. 4 which enables the inverter 81 to be disabled during shipping and installation. The arrangement 138 enhances simplified installation of the invention to lighting fixtures since said arrangement 138 combines into a single unit both test switch and pilot light functions. In the prior art, installation required the drilling of two holes to accommodate the test switch and pilot light devices.

Figure 6:
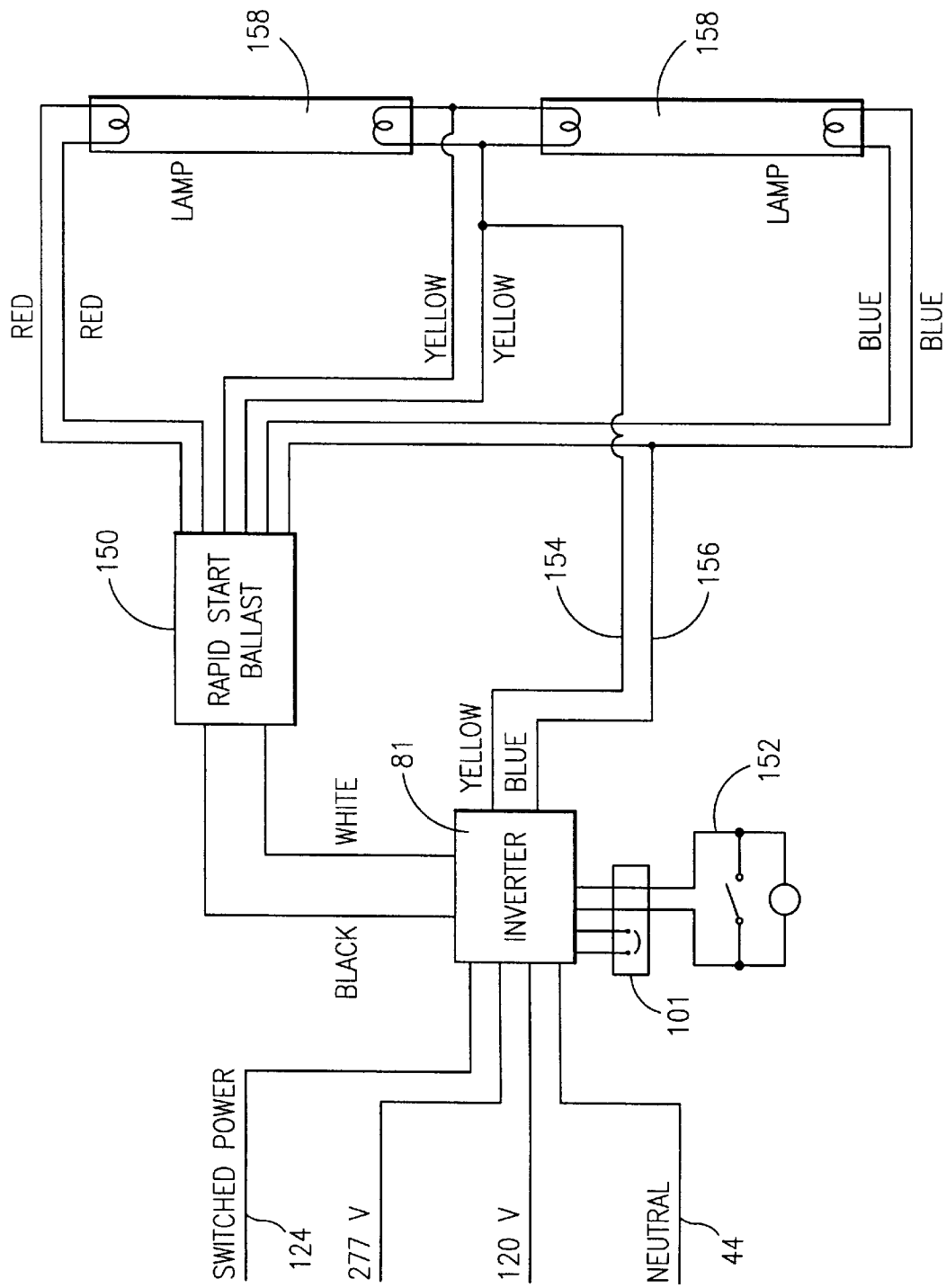
FIG. 6 is a diagram illustrating simplified electrical connections according to the invention of the improved inverter circuitry to a rapid-start ballasted fixture.

FIG. 6 illustrates the simplified connections made possible according to the present invention by the present inverter circuitry as embodied in the inverter 81 and used with a rapid-start ballast 150. The intended objects of the invention are made possible by the inverter 81 with only a two-wire connection to lamps 158. These connections may be made by the use of insulation displacement connectors since it is not necessary to sever or disconnect any ballast-to-lamp wiring. The output of the inverter 81 is connected to the electronic ballast 150 by means of leads 154 and 156.

Figure 7:
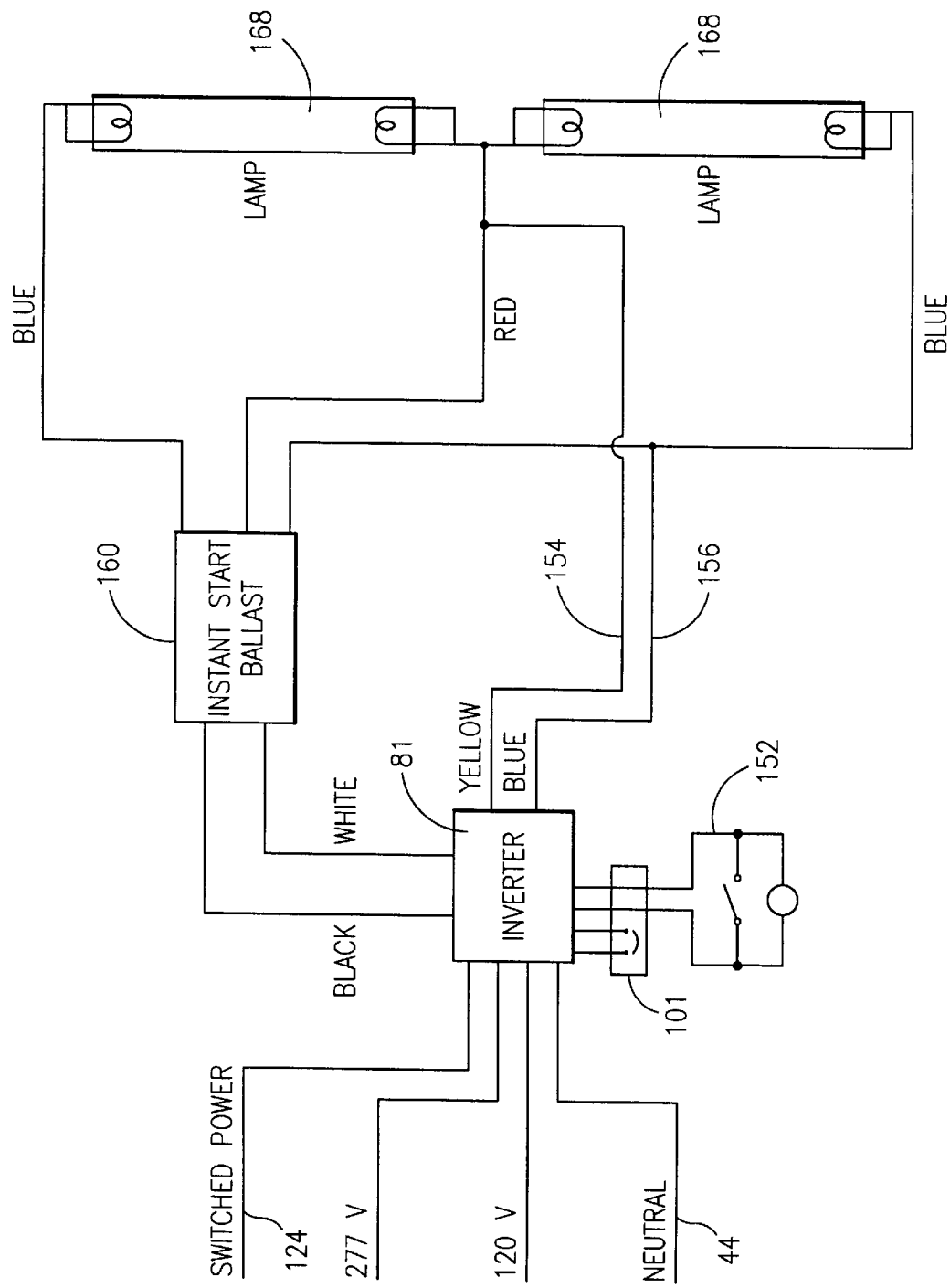
FIG. 7 is a diagram illustrating the simplified electrical connections of the improved inverter circuitry of the invention to an instant-start ballasted fixture; and, FIG. 8 is a schematic illustrating the use of a semiconductor device in circuitry similar to the circuitry of FIG. 4 to prevent inverter output from loading the ballast.

FIG. 7 illustrates the simplified connections made possible by the inverter circuitry of the invention when using instant-start electronic ballasts such as the ballast 160. In a fashion identical to that described relative to FIG. 6, inverter output leads 154 and 156 connect to the electronic ballast 160 with only a two-wire connection being made to the lamps 168. Insulation displacement connectors (not shown) can also be used in the system of FIG. 7 since it is unnecessary to sever fixture wiring during the installation process. The installation process produces a "clean" fixture wiring even through rapidly and easily installed.

Referring now to FIG. 8, an alternative embodiment is shown which is identical in most respects to the circuitry of FIG. 4. The circuit of FIG. 8, however, utilizes a high voltage semiconductor switching device, such as triac 200 to effectively provide the function of the relay 65 of FIG. 4. The triac 200 is seen to be connected to a winding 202 of the transformer 78 such that a gate signal is provided to the triac 200 from the inverter 81 when the inverter 81 is operational. Accordingly, the triac 200 is turned on and connection is made of output to lead 204. The triac 200 could alternatively be tapped off at any point of the winding of the transformer 78 rather than by providing the winding 202. Resistor 206 is provided between the triac 200 and the winding 202 as a current limiting mechanism, it not being possible to directly connect the winding 202 to the gate of the triac 200. It is to be understood that other high voltage semiconductor switching devices could be utilized in place of the triac 200, the triac 200 being shown for purposes of illustration. Remaining portions of the circuitry of FIG. 8 which are essentially identical to the circuitry shown in FIG. 4 are illustrated as having like numerals, these circuitry components functioning in the same manner in the circuitry of FIG. 8 as in the circuitry of FIG. 4.

It is to be understood that the invention can be practiced other than as explicitly shown in the drawings and described herein, the description provided herein being exemplary and not being intended to be limiting of the invention. As an example, a product can be envisioned which would employ a two-wire connection to lamping regardless of whether the ballast was magnetic or electronic. In such a situation, an internal connection between the inverter output circuitry and the ballast primary relay would be unnecessary and could be eliminated.

What is claimed is:

1. In an emergency lighting system which can be connected to a fluorescent lighting fixture having at least one discharge lamp and a ballast for driving the lamp, the ballast being a magnetic ballast or an electronic ballast having an output stage which is magnetically isolated from remaining ballast circuitry, the ballast having a primary side for connection to normal AC power and a lamp side connected to the lamp, improved inverter circuitry having first and second power leads and a first lamp connection lead, the first and second power leads being connected to the primary side of the ballast and the first lamp connection lead being connected to a first lamp side, the inverter circuitry producing a DC output through the lamp connection lead to the lamp, the inverter circuitry being improved by means additional to the first lamp connection lead for coupling or connecting the output of the inverter circuitry to the lamp, said means being employed in the system when said electronic ballast is used therein, only the first lamp connection being necessary in the system when said magnetic ballast is used therein.

2. In the system of claim 1 wherein the means comprises a second lead from the inverter circuitry to the lamp.

3. In the system of claim 2 wherein the means further comprise a relay connecting the first and second output leads of the inverter circuitry to the lamp, the relay being open when power is applied to the ballast.

4. In the system of claim 3 wherein the improvement further comprises a transistor switch for turning on the inverter circuitry.

5. In the system of claim 1 wherein the system comprises a first and second relay for opening up primary leads of the ballast, a third relay for connecting the output leads of the inverter circuitry to the lamp, and a second lead from the inverter circuitry to the lamp, the second lead connecting to a contact of the third relay, the third relay and the second lead comprising said means.

6. In the system of claim 1 wherein the improvement further comprises means for modifying inverter output to produce either a high voltage DC output or a pulsating DC output through the lamp connecting lead to the lamp.

7. In the system of claim 6 wherein the modifying means comprise a voltage doubling rectifier circuit.

8. In the system of claim 1 wherein the system further comprises a battery, a battery charging circuit and a line voltage monitor, the battery charging circuit being connected to the inverter circuitry through the battery and the line monitor being connected to the inverter circuitry, the inverter circuitry starting and operating the lamp using power from the battery on a drop in line voltage.

9. In the system of claim 1 wherein the system further comprises test means connected to the inverter circuitry for testing battery condition.

10. In the system of claim 1 wherein the system further comprises battery connection means disposed exteriorly of the system for connection of the battery and the inverter circuitry.

11. In the system of claim 1 wherein the improvement further comprises means for preventing the output of the inverter circuitry from loading the ballast.

12. In the system of claim 11 wherein the preventing means comprises a single relay contact.

13. In the system of claim 11 wherein the preventing means comprises a triac.

14. In the system of claim 11 wherein the preventing means comprise a semiconductor device having sufficient AC blocking capability in the off condition to prevent the output of the inverter circuitry from loading the ballast.

15. In the system of claim 1 wherein the means further comprise a relay for connecting the power leads of the inverter circuitry to the ballast and a second lead from the inverter circuitry to the lamp, the second lead connecting to a contact of the relay.

16. In an emergency lighting system which can be connected to a fluorescent lighting fixture having at least one discharge lamp and a ballast for driving the lamp, the ballast being a magnetic ballast or an electronic ballast which may have an output stage which is magnetically isolated from remaining ballast circuitry, the ballast having a primary side for connection to normal AC power and a lamp side connected to the lamp, improved inverter circuitry having first and second power leads and first and second lamp connection leads, the first and second power leads being connected to the primary side of the ballast and the first and second lamp connection leads being connected to the lamp, the inverter circuitry producing a DC output through the lamp connection leads to the lamp, the inverter circuitry being improved by means for coupling or connecting the output of the inverter to the lamp, said means being employed in the system when either said electronic ballast or magnetic ballast is used therein.

\* \* \* \* \*